United States Patent [19]

Heyraud

[11] 4,291,457
[45] Sep. 29, 1981

[54] METHOD OF MAKING SELF-SUPPORTING ROTOR COIL DC-MACHINE

[76] Inventor: Marc Heyraud, Recorne 24b, 2300 La Chaux-de-Fonds, Switzerland

[21] Appl. No.: 63,094

[22] Filed: Aug. 2, 1979

[30] Foreign Application Priority Data

Aug. 9, 1978 [CH] Switzerland .................. 8460/78

[51] Int. Cl.³ .......................................... H02K 15/02
[52] U.S. Cl. ........................................ 29/598; 29/605; 310/266
[58] Field of Search .................. 29/596, 598, 605; 310/264, 265, 266

[56] References Cited

U.S. PATENT DOCUMENTS 3,412,354  11/1968  Sattler ............................ 29/605 X
4,048,713   9/1977  Hvass ............................. 29/605 X
4,110,901   9/1978  Nakamura et al. ................ 29/598

Primary Examiner—Carl E. Hall
Attorney, Agent, or Firm—Cushman, Darby & Cushman

[57] ABSTRACT

A cylindrical, ironless, self-supporting rotor coil for use in an electrical dc-machine is disclosed. The coil is formed by at least one layer of wire in which the wire is at least in part placed in an oblique direction with respect to the generatrixes of the cylindrical rotor surface. The wire comprises a central core, an insulating layer and an outer layer of a supporting material capable of being softened during or after winding and subsequently solidified. The coil is made with a final winding pitch such that the insulating layers of adjacent wire parts are at least nearly in contact, the supporting material filling the remaining spaces between the insulating layers.

5 Claims, 10 Drawing Figures

U.S. Patent  Sep. 29, 1981  Sheet 1 of 2  4,291,457
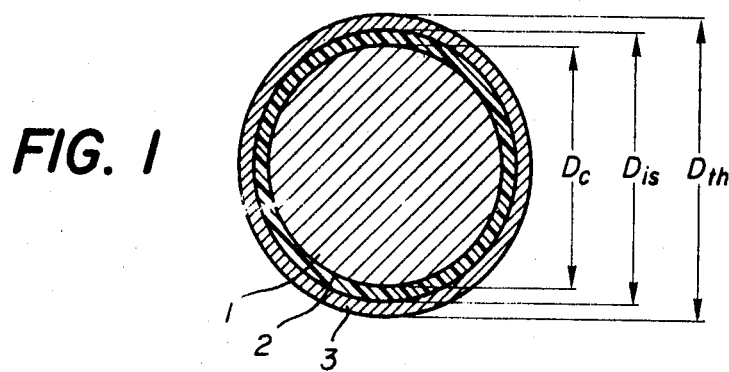
FIG. 1
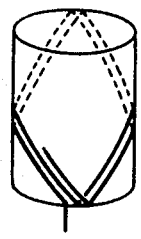 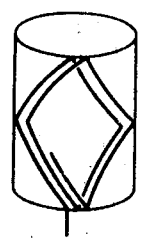  
FIG. 2a   FIG. 2b   FIG. 2c   FIG. 2d
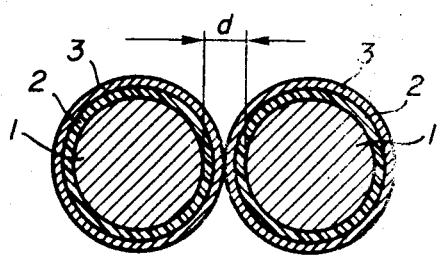 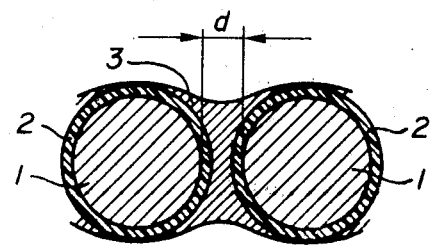
FIG. 3a   FIG. 3b

METHOD OF MAKING SELF-SUPPORTING ROTOR COIL DC-MACHINE

FIELD AND BACKGROUND OF THE INVENTION

The invention relates to electrical dc-machines of the kind having a stationary magnetic circuit with an air gap and a cylindrical, ironless, self-supporting rotor coil comprising a so-called oblique winding mounted for rotation in the said air gap. More particularly, the invention concerns a rotor coil for use in such a machine and methods of making the same.

Rotor coils with which the present invention is concerned comprise a plurality of coil sections connected in series with each other, the ends of each coil section being adapted for connection to respective commutator segments of the dc-machine. The coil is generally formed by at least one layer of wire, the wire comprising at least a conductive core and an insulating layer surrounding said core.

Due to the problem in winding self-supporting coils in which the wire is at least in part placed in an oblique direction with respect to the generatrixes of the cylindrical rotor surface, known rotor coils of this type have a relatively poor filling factor and/or limited mechanical stability.

SUMMARY OF THE INVENTION

The main object of the invention is to provide a rotor coil of the type mentioned above, the filling factor of which is considerably increased with respect to known coils and the mechanical stability of which is improved. A further object of the invention is to provide a simple and economical method of making rotor coils of the mentioned type with a very high filling factor and very good mechanical stability.

To this effect, in the self-supporting rotor coil according to the invention, the laterally adjacent wire parts of a layer of the coil are placed such that the distance of the centers thereof, in a cross-sectional plane of said wire parts, is substantially equal to the outer diameter of the insulating layer surrounding the wire core and at least the spaces between the insulating layers of adjacent wire parts are filled with a solidified supporting material. In making the coil a wire is used which comprises an outer layer surrounding the insulating layer, which outer layer is of a material capable of being softened and subsequently solidified. The said outer layer is subjected to a softening treatment during winding or after at least partial winding of the coil and in the latter case the coil or a part thereof is subjected to a tightening action to realize the coil according to the invention.

BRIEF DESCRIPTION OF THE DRAWINGS

The nature, objects and advantages of the invention will be more fully understood from the following description in accordance with the accompanying drawings in which:

FIG. 1 is a cross-section of a wire used in the coil according to the invention;

FIGS. 2a, 2b, 2c and 2d are, respectively, schematical representations of coil forms with which the present invention is concerned.

FIGS. 3a and 3b are cross-sectional views of adjacent wire parts in a coil after winding and after a softening treatment, respectively, when using a conventional coil making method;

DESCRIPTION OF THE DRAWINGS AND OF PREFERRED EMBODIMENTS OF THE INVENTION

Figure 4:
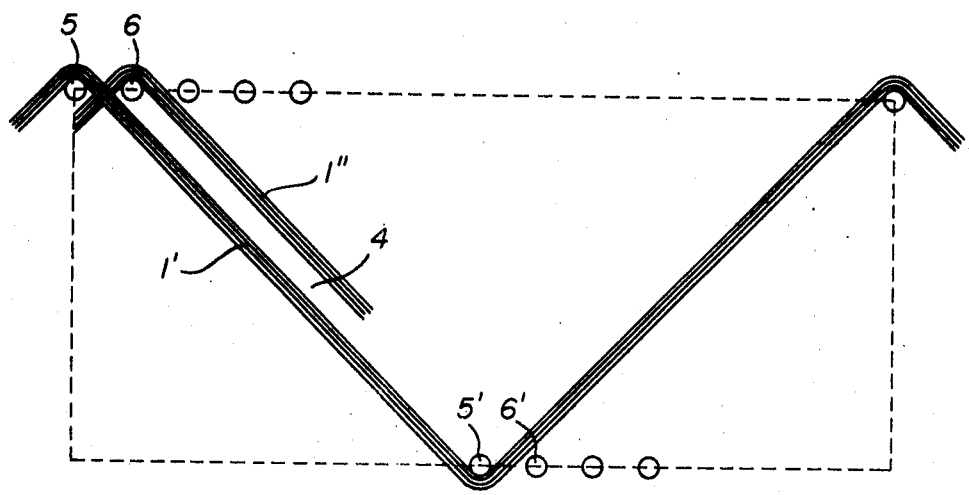
FIG. 4 is a schematic illustration of a known winding method.

The wire used for making self-supporting coils of the type with which the present invention is concerned is shown in cross-section in FIG. 1. A conductive core 1, generally of copper or aluminium, is surrounded by an electrically insulating layer 2 which can be made of plastics or of other suitable materials such as aluminium oxide.

The insulating layer 2 is itself surrounded by an outer layer 3 which is made of a material capable of forming the necessary mechanical support of the coil. Such a material can be a thermoplastic or thermosetting plastics material which can be softened by a thermal treatment, or a plastics material which can be softened by a chemical agent, such as a solvent, which materials solidify subsequently by cooling off or after evaporation of the solvent 1 for example.

The outer diameters of the core 1, the insulating layer 2 and the outer layer 3 are designated by $D_c$, $D_{is}$ and $D_{th}$, respectively. As an example, $D_c=0.100$ mm, $D_{is}=0.115$ mm, $D_{th}=0.127$ mm. The outer layer thus constitutes a large portion of the wire while only the core is the useful part thereof. A reduction of the thickness of layer 3 which provides the only mechanical support for the coil would affect the mechanical stability thereof.

Self-supporting coils for ironless rotors with which the present invention is concerned are schematically illustrated in FIGS. 2a to 2d. They are generally wound continuously, such as in an oblique direction over 180 electrical degrees (FIG. 2a), or in a lozenge-shape (FIG. 2b), or in a manner derived from these basic shapes, such as a hexagonal shape (FIG. 2c) or a trapezoidal shape (FIG. 2d). The coils can further be divided into two main groups: those in which the wire turns are placed side by side (such as shown in the German (Fed.-Rep.) Pat. No. 1,188,709, in Swiss Pat. Nos. 472,135 and 549,305, or in the German (Democratic Republic) Pat. No. 60,091) and those in which the turn-back points of the wire turns are separated by 180 electrical degrees (such as in the German (Fed.Rep.) Pat. No. 1,463,855).

The known rotor coils have all the disadvantage of having a poor filling factor, and of not allowing to make optimal use of the outer layer of the wire to assure good mechanical properties of the coil.

FIGS. 3a and 3b show the position of adjacent wire parts in a conventional coil wherein the turns of wire are wound side by side. After the winding process the distance d between the outer surface of the cores 1 of adjacent wire parts is twice the thickness of the insulating layer 2 and the outer layers 3, as shown in FIG. 3a. When subjecting the outer layers to a softening treatment, such as in the case of thermoplastic material by heating the coil in order to reach a regular distribution of the thermoplastic material 3 between the adjacent wire parts, the final configuration is as shown in the cross-sectional view of FIG. 3b.

The spacing of the cores 1 remains d and a large quantity of material 3 is present between the insulating layers 2, the connection providing however only limited mechanical strength.

As far as the case of winding with a pitch of exactly 180 electrical degrees as mentioned above, is concerned, the filling of the coil space with wire core is even less than in the preceding case.

FIG. 4 shows in a developed view such a winding, in which groups of wire such as the adjacent groups 1', 1" are wound around pins 5, 5' and 6, 6', respectively thus leaving additional space 4 between the groups of wire. In addition, useful space is lost due to the generally occurring crossing of the wire parts when turning around the winding pins.

Figure 5:
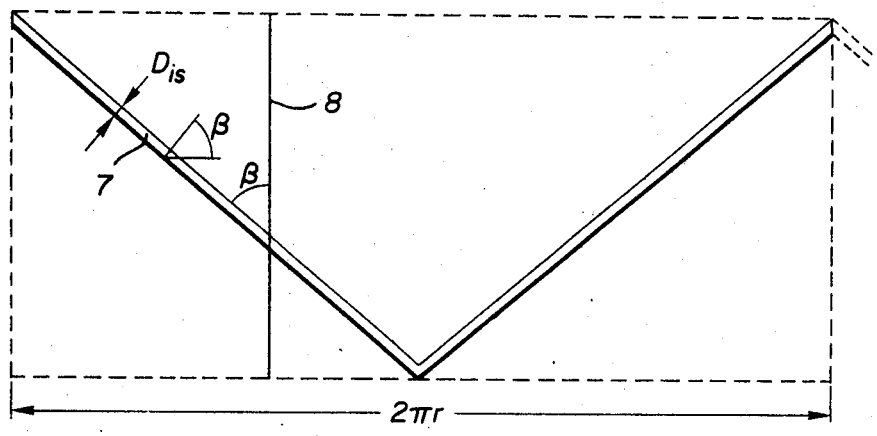
FIG. 5 is a schematic representation of an oblique winding developed in a plane.

FIG. 5 shows schematically the development of one turn of wire in an oblique winding of a coil having a diameter r. The wire 7 is shown with its invariable part only, i.e. with an outer diameter of $D_{is}$, without the layer 3. If $\beta$ designates the angle formed between the wire and a generatrix 8 of the coil surface, the maximum filling of the coil corresponds to a number of turns per layer equal to $$2\pi r/(K_1 \cdot D_{is}) \text{ with } K_1 = 1/\cos\beta$$

According to the present invention, this condition can be reached at least approximately.

Figure 6:
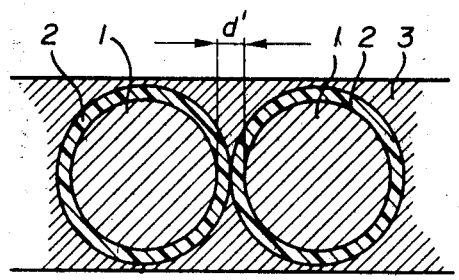
FIG. 6 is a cross-sectional view of adjacent wire parts in a rotor coil according to the invention.

FIG. 6 shows the ideal position of adjacent wire parts in a cross-sectional view thereof. The distance between the outer surfaces of the wire cores 1 is reduced to the minimum d', which means that the distance between the centers of the wire parts is equal to $D_{is}$. In the example of the wire diameters mentioned above, the increase of the filling factor is approximately 12% with respect to the condition illustrated in FIG. 3b. Furthermore, the supporting material 3 is entirely used for filling the outer space between the insulating layers 2 as shown in FIG. 6 and thus provides optimum mechanical stability of the coil.

The method of making a rotor coil in accordance with the invention includes subjecting the outer layer 3 of the wire to a softening treatment and placing the wire parts at least approximately in the ideal position of FIG. 6 while the outer layer is in the softened condition. This can be done during the actual winding process. For example, in case the outer layer is of a thermoplastic material, the winding machine is adapted for winding with a pitch corresponding to the optimal filling, i.e. a pitch of $D_{is}/\cos\beta$, and the wire is heated while the coil is being wound. A similar method to achieve the desired optimal pitch consists in pressing a heated wire while forming a wire turn against the previously wound wire turn.

Heating can take place by infra-red light or by bringing the wire in contact with a hot surface. Another way of softening the outer layer of the wire is to use a chemical agent, for instance to lead the wire though a bath of a solvent of the material forming the outer layer.

An alternative method of making the coil in accordance with the invention, is to wind at least part of it in a conventional manner and to heat the coil subsequently or bring it in contact with a chemical agent, such as a solvent, to soften the outer layers 3. In the softened condition the coil is then subjected to a mechanical tightening action, such as by pressing the turns against each other.

The choice of the method to be used depends of course on the shape of the coil to be realised and on the material of the outer layer. Furthermore, depending on the winding equipment available the method can be slightly adapted without departing from the spirit of the present invention.

I claim:

1. A method of making a cylindrical, ironless, self-supporting rotor coil, wherein the wire used for winding the coil comprises an outer layer of a material capable of being softened and subsequently solidified, said outer layer surrounding an insulating layer of the wire, comprising the step of subjecting said wire to a softening treatment of said outer layer during the winding process, a winding pitch being made substantially equal to $D_{is}/\cos\beta$, where $D_{is}$ represents the outer diameter of the said insulating layer of the wire and $\beta$ the angle formed between the wire placed on the coil and a generatrix of the cylindrical rotor surface.

2. A method of making a cylindrical, ironless, self-supporting rotor coil, wherein the wire used for winding the coil comprises an outer layer of a material capable of being softened and subsequently solidified, said outer layer surrounding an insulating layer of the wire, comprising the steps of subjecting the coil after at least partial winding, to a treatment for softening the said outer layer of the wire and subjecting the wire to a treatment for tightening up the coil or coil part to achieve a pitch of the wound coil substantially equal to $D_{is}/\cos\beta$, where $D_{is}$ represents the outer diameter of the said insulating layer of the wire and $\beta$ the angle formed between the wire placed on the coil and a generatrix of the cylindrical rotor surface.

3. A method as claimed in claim 1 or 2, wherein the softening treatment is a thermal treatment.

4. A method as claimed in claim 1 or 2, wherein the softening treatment is a chemical treatment.

5. A method as claimed in claim 2, wherein the treatment for tightening up the coil or coil part is a mechanical compression of the wire turns.

* * * * *